United States Patent
Chen et al.

(10) Patent No.: US 11,438,027 B2
(45) Date of Patent: Sep. 6, 2022

(54) BASE STATION ANTENNA AND BASE STATION

(71) Applicant: Samsung Electronics Co., Ltd., Gyeonggi-do (KR)

(72) Inventors: Lin Chen, Shenzhen (CN); Meiling Zhang, Shenzhen (CN); Qin Li, Shenzhen (CN); Wei Jiang, Shenzhen (CN); Jia Yan, Shenzhen (CN); Shaomin Zhang, Shenzhen (CN)

(73) Assignee: Samsung Electronics Co., Ltd

( * ) Notice: Subject to any disclaimer, the term of this patent is extended or adjusted under 35 U.S.C. 154(b) by 157 days.

(21) Appl. No.: 17/029,357

(22) Filed: Sep. 23, 2020

(65) Prior Publication Data

US 2021/0091821 A1    Mar. 25, 2021

(30) Foreign Application Priority Data

Sep. 24, 2019  (CN) .......................... 201910904020.4

(51) Int. Cl.
| | |
|---|---|
| *H01Q 1/24* | (2006.01) |
| *H01Q 21/22* | (2006.01) |
| *H04B 3/52* | (2006.01) |
| *H04B 3/56* | (2006.01) |
| *H01Q 21/00* | (2006.01) |
| *H04B 7/15* | (2006.01) |

(52) U.S. Cl.
CPC ................. *H04B 3/52* (2013.01); *H01Q 1/24* (2013.01); *H01Q 1/246* (2013.01); *H01Q 21/00* (2013.01); *H01Q 21/22* (2013.01); *H04B 3/56* (2013.01); *H04B 7/15* (2013.01)

(58) Field of Classification Search
CPC .......... H01Q 1/246; H01Q 21/22; H01Q 1/24; H01Q 21/00; H04B 3/52; H04B 3/56; H04B 7/15542
USPC ........................................................ 343/776
See application file for complete search history.

(56) References Cited

U.S. PATENT DOCUMENTS

| | | | |
|---|---|---|---|
| 5,764,187 A | 6/1998 | Rudish et al. | |
| 2005/0085266 A1* | 4/2005 | Narita .................. | H04B 7/0874 455/133 |

(Continued)

FOREIGN PATENT DOCUMENTS

| | | |
|---|---|---|
| CN | 101578737 | 11/2009 |
| CN | 102907168 | 1/2013 |
| CN | 103503233 | 7/2015 |

*Primary Examiner* — Hai V Tran
(74) *Attorney, Agent, or Firm* — The Farrell Law Firm, P.C.

(57) ABSTRACT

A base station antenna and a base station including the base station antenna are provided. A base station antenna includes a transceiver array configured to output M signals, wherein M is an integer greater than 1; an antenna array including N antenna units, wherein N is an integer greater than M; a first-level signal allocating network configured to allocate first power to the M signals, and output P signals, wherein P is an integer greater than M; a signal synthesizing network including multiple signal synthesizers, wherein each of the multiple signal synthesizers utilizes two signals of the P signals to synthesize two output signals; and a second-level signal allocating network configured to allocate second power to signals output by the multiple signal synthesizers, and output N signals to the N antenna units.

18 Claims, 4 Drawing Sheets

(56) References Cited

U.S. PATENT DOCUMENTS

| | | |
|---|---|---|
| 2009/0322610 A1 | 12/2009 | Hants et al. |
| 2014/0132450 A1 | 5/2014 | Chen et al. |
| 2015/0098495 A1* | 4/2015 | He .................... H01Q 3/34 |
| | | 375/219 |
| 2015/0139348 A1* | 5/2015 | Tong .................. H04B 7/068 |
| | | 375/267 |
| 2019/0222326 A1* | 7/2019 | Dunworth ............ H04B 1/04 |
| 2020/0266891 A1* | 8/2020 | Murakami ......... H04B 10/116 |

* cited by examiner

BASE STATION ANTENNA AND BASE STATION

CROSS REFERENCE TO RELATED APPLICATION

This application is based on and claims priority under 35 U.S.C. § 119(a) to Chinese Patent Application Serial No. 201910904020.4, which was filed in the Chinese National Intellectual Property Administration on Sep. 24, 2019, the entire disclosure of which is incorporated herein by reference.

BACKGROUND

1. Field

The disclosure relates generally to communication technologies, and more particularly, to an improved base station antenna and a base station including the improved base station antenna.

2. Description of the Related Art

A base station antenna is commonly configured to transmit and receive signals. Transmission and reception performances of the base station antenna have a significant impact on a mobile communication network.

Key performances of the base station are directly affected by the size of scan angle adjustment range in the vertical direction of the base station antenna. Due to the influence of the rapidly rising side lobes, the adjustment range of the upper and lower slant angles of a conventional array antenna is limited by the number of effective input ports on a vertical plane of the array. Beam side lobes may be effectively suppressed, by adding a coupled network between an effective input port and an antenna radiating unit, in order to expand the adjustment range of up and down slant angles.

Currently, in a coupled network, vector synthesis of signals is usually performed by a phase shifter and a sum-difference device. For example, the sum-difference device may be at least one an adder, a summer, a subtracter, etc. However, due to the use of the phase shifter and the sum-difference device, many hardware cross-connections exist in the current coupled network, leading to complicated structures and greater insertion loss.

SUMMARY

The disclosure has been made to address the above-mentioned problems and disadvantages, and to provide at least the advantages described below.

An aspect of the disclosure is to provide a base station antenna and a base station utilizing the same.

In accordance with an aspect of the disclosure, a base station antenna is provided, which includes a transceiver array configured to output M signals, wherein M is an integer greater than 1; an antenna array including N antenna units, wherein N is an integer greater than M; a first-level signal allocating network configured to allocate first power to the M signals, and output P signals, wherein P is an integer greater than M; a signal synthesizing network including multiple signal synthesizers, wherein each of the multiple signal synthesizers utilizes two signals of the P signals to synthesize two output signals; and a second-level signal allocating network configured to allocate second power to signals output by the multiple signal synthesizers, and output N signals to the N antenna units.

In accordance with another aspect of the disclosure, a base station is provided, which includes a base station antenna; and at least one processor, wherein the base station antenna includes a transceiver array configured to output M signals, wherein M is an integer greater than 1, an antenna array including N antenna units, wherein N is an integer greater than M, a first-level signal allocating network configured to allocate first power to the M signals, and output P signals, wherein P is an integer greater than M, a signal synthesizing network including multiple signal synthesizers, wherein each of the multiple signal synthesizers utilizes two signals of the P signals to synthesize two output signals, and a second-level signal allocating network configured to allocate second power to signals output by the multiple signal synthesizers, and output N signals to the N antenna units.

BRIEF DESCRIPTION OF THE DRAWINGS

The above and other aspects, features, and advantages of certain embodiments of the present disclosure will be more apparent from the following description taken in conjunction with accompanying drawings, in which.

DETAILED DESCRIPTION

Embodiments of the present disclosure are described with reference to the accompanying drawings. Descriptions of well-known components and processing techniques are omitted so as to not unnecessarily obscure the present disclosure. The examples used herein are intended merely to facilitate an understanding of ways in which the present disclosure may be practiced and to further enable those of skill in the art to practice the present disclosure. Accordingly, the examples are not intended to be construed as limiting the scope of the present disclosure.

Figure 1:
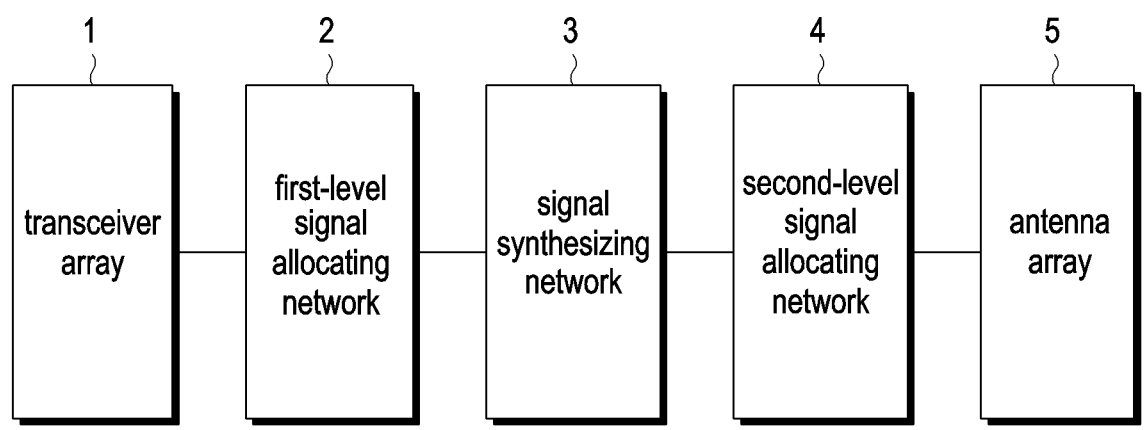
FIG. 1 illustrates a base station antenna, according to an embodiment.

FIG. 1 illustrates a base station antenna, according to an embodiment.

Referring to FIG. 1, the base station antenna includes a transceiver array 1, a first-level signal allocating network 2, a signal synthesizing network 3, a second-level signal allocating network 4, and an antenna array 5.

The transceiver array 1 may output M signals, wherein M is an integer greater than 1. The transceiver 1 may also be referred to as a signal input end. The quantity of transceivers in the transceiver array 1 is consistent with the value of M.

The antenna array 5 may include N antenna units, wherein N is an integer greater than M. For example, N is 6, 8, 10, or 12.

The first-level signal allocating network 2, the signal synthesizing network 3, and the second-level signal allocating network 4 may form a signal coupling network of the base station antenna. The signal coupling network may be a network with M inputs and N outputs.

The first-level signal allocating network 2 may allocate power to the M signals, and output P signals, wherein P is an integer greater than M. The first-level signal allocating network 2 may include multiple power dividers. The first-level signal allocating network 2 may utilize the power dividers to allocate power to each of the M signals. For example, the first-level signal allocating network 2 may divide each of the M signals into two or more signals.

The signal synthesizing network 3 may include multiple signal synthesizers. Each signal synthesizer utilizes two of the P signals receiving from the first-level signal allocating network 2 in order to synthesize two output signals, and controls the two output signals to be at a predetermined phase and predetermined amplitude. Each signal synthesizer may be a hardware circuit device, e.g., a microstrip line on a dielectric substrate.

A signal synthesizer may be a four-port device, wherein the signal synthesizer obtains two signals via two input ports, and performs a vector synthesizing process on the two signals. Accordingly, the signal synthesizer may process the two signals, based on a predetermined mathematical model, in order to output two vector signals.

Figure 2:
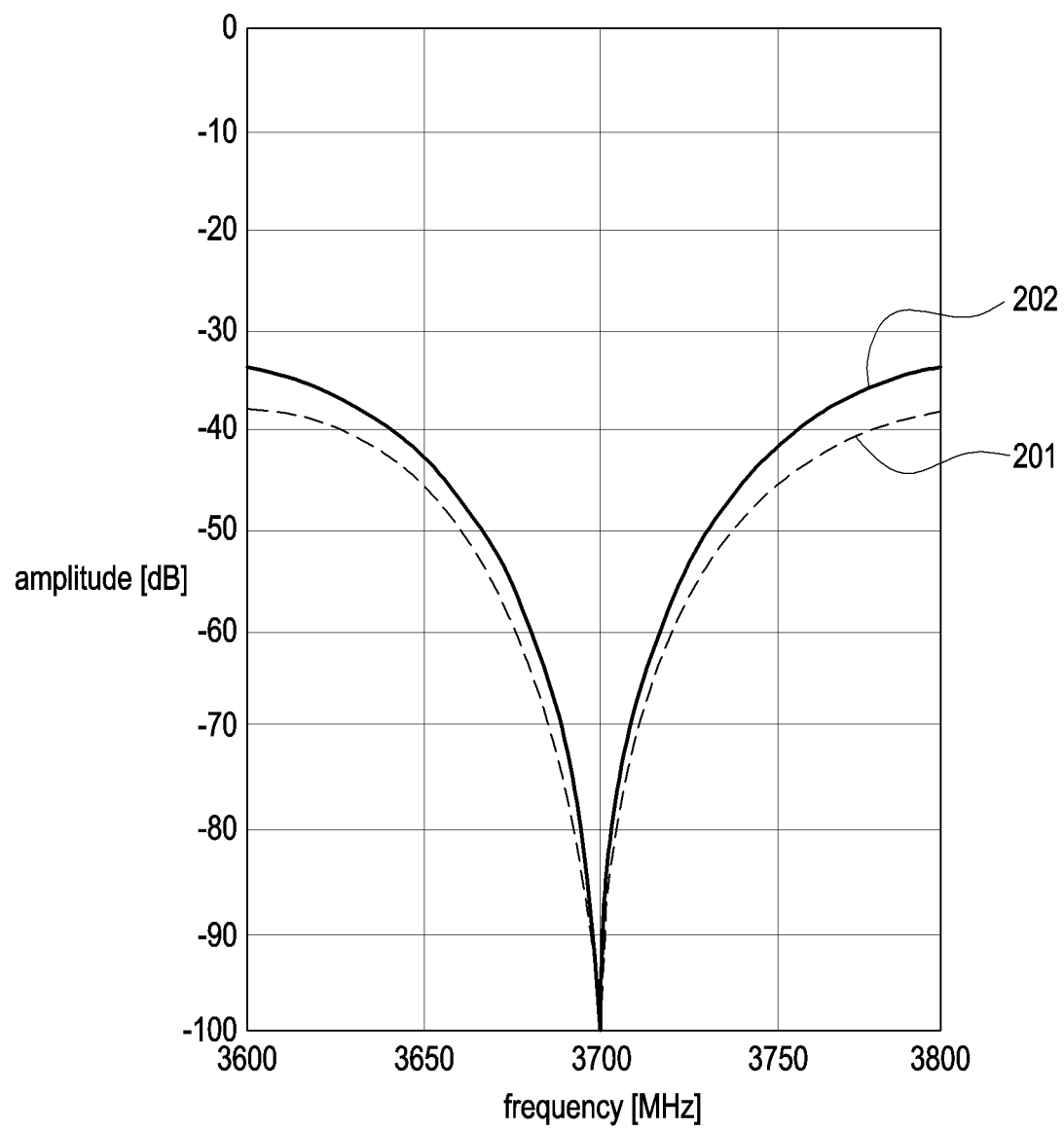
FIG. 2 is a curve illustrating broadband characteristics of a signal synthesizer according to an embodiment.

FIG. 2 is a curve illustrating broadband characteristics of a signal synthesizer according to an embodiment.

Referring to FIG. 2, signal reflection energy 201 of the signal synthesizer is less than −30 dB, and the input-output port isolation 202 of the signal synthesizer is less than −30 dB. Thus, the signal synthesizer meets actual use requirements.

Referring again to FIG. 1, the second-level signal allocating network 4 may include multiple power dividers. The second-level signal allocating network 4 is configured to allocate power to multiple signals, which are output by various signal synthesizers in the signal synthesizing network 3, and output N signals to N antenna units in the antenna array 5.

The transceiver array 1 may adjust an up slant angle and a down slant angle of the antenna array 5, by adjusting a phase difference between different transceivers.

In accordance with an aspect of the disclosure, the base station antenna performs a vector synthesizing process on signals by utilizing a signal synthesizer, in order to avoid utilizing a phase shifter and a sum-difference device. This simplified structure of a signal coupling network, which reduces the quantity of components in the signal coupling network and simplifies connections among the components, reduces insertion loss of the base station antenna and improves flexibility for establishing the signal coupling network. More particularly, because the signal synthesizer is used to simplify the structure of the signal coupling network, a base station antenna according to an embodiment of the disclosure may quickly iterate based on practical needs.

For any two groups of antenna units in the antenna array 5, a sum of phases of each antenna unit in a group of antenna units is equal to a sum of phases of each antenna unit in another group of antenna units. Each group of antenna units includes two antenna units with symmetrical positions in the antenna array 5. For example, the two antenna units in each group of antenna units are symmetrical to a normal at the center of the antenna array. According to an embodiment of the disclosure, the base station antenna allows the sum of phases of each group of antenna units to be equal by using the signal coupling network, thereby guaranteeing an accurate slant-angle adjustment of the antenna array.

Figure 3:
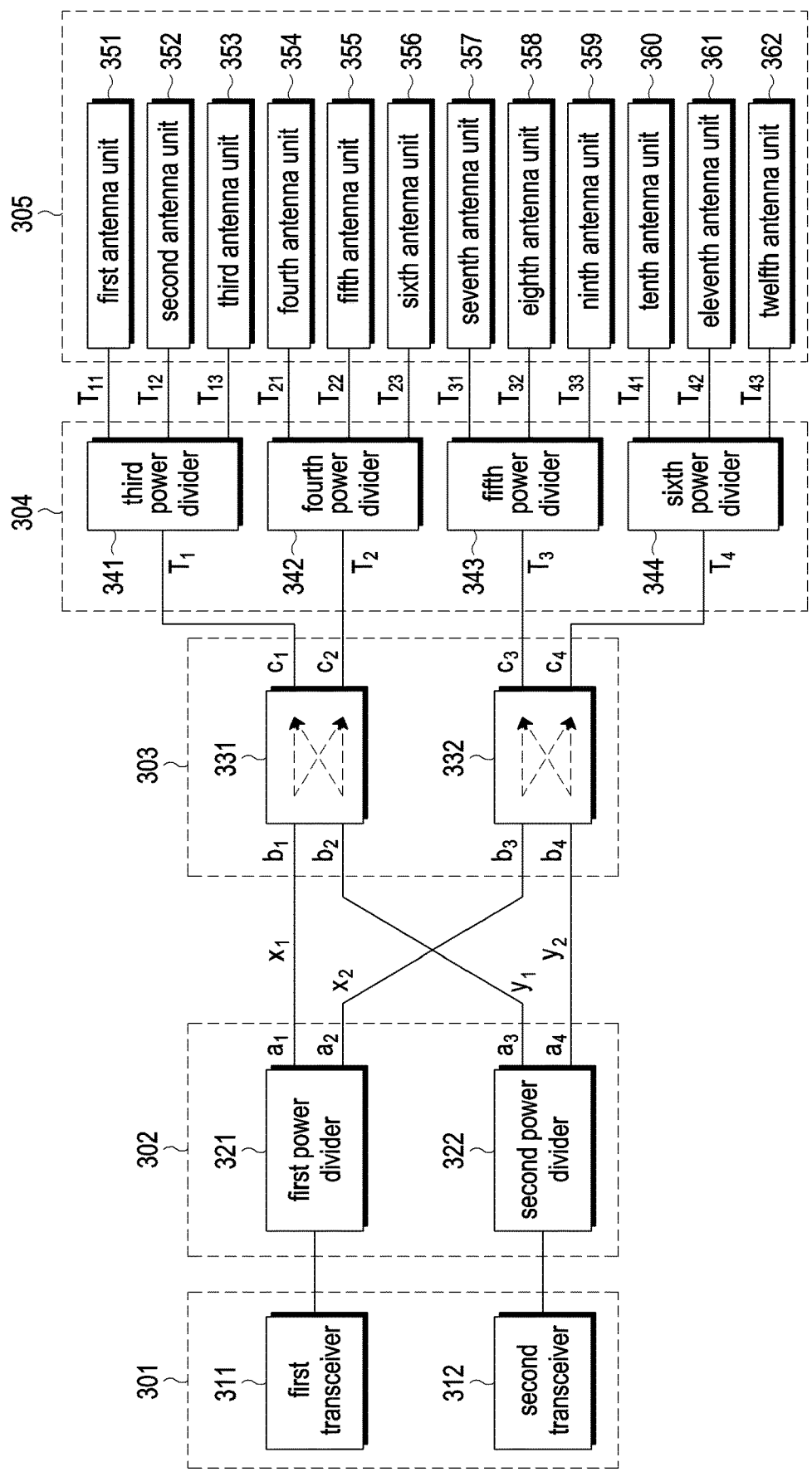
FIG. 3 illustrates a base station antenna, according to an embodiment.

FIG. 3 illustrates a base station antenna according to an embodiment. More specifically, in order to illustrate the topology of the base station antenna more vividly, FIG. illustrates an example in which the value of M is 2 and the value of N is 12.

Referring to FIG. 3, a transceiver array 301 includes a first transceiver 311 and a second transceiver 312.

A first-level signal allocating network 302 includes a first power divider 321 and a second power divider 322. An input end of the first power divider 321 is coupled to an output end of the first transceiver 311. An input end of the second power divider 322 is coupled to an output end of the second transceiver 312.

A signal synthesizing network 303 includes a first signal synthesizer 331 and a second signal synthesizer 332. A first input end b1 of the first signal synthesizer 331 is coupled to a first output end a1 of the first power divider 321. A second input end b2 of the first signal synthesizer 331 is coupled to a first output end a3 of the second power divider 322. A first input end b3 of the second signal synthesizer 332 is coupled to a second output end a2 of the first power divider 321. A second input end b4 of the second signal synthesizer 332 is coupled to a second output end a4 of the second power divider 322.

The signals output by the first power divider 321 are x1 and x2. The signals output by the second power divider 322 are y1 and y2. The first signal synthesizer 331 may perform a vector synthesis on signals x1 and y1, and output signals $T_1$ and $T_2$. The second signal synthesizer 332 may perform a vector synthesis on signals x2 and y2, and output signals $T_3$ and $T_4$. In a sequence formed by multiple signals output by the signal synthesizing network 303, a sum of vectors of each signal group is the same. The $i^{th}$ group of signals includes both $i^{th}$ signal count from forwards and backwards.

As illustrated in FIG. 3, phases of signals $T_1$, $T_2$, $T_3$, and $T_4$ are respectively $P(T_1)$, $P(T_2)$, $P(T_3)$, and $P(T_4)$. A sum of phases of a first output end c1 of the first signal synthesizer 331 and a second output end c4 of the second signal synthesizer 332 is equal to a sum of phases of a second output end c2 of the first signal synthesizer 331 and a first output end c3 of the second signal synthesizer 332. That is, signals output by the signal synthesizing network 303 meet requirements of Equation (1):

$$P(T_1)+P(T_4)=P(T_2)+P(T_3) \qquad (1)$$

Table 1 below shows examples of phases, when down slant angles of signals ($T_1$ to $T_4$) output by the signal synthesizing network 303 are respectively 1, 2, 3, and 4. The phases in Table 1 meet requirements of Equation (1).

TABLE 1

| | phase signal | | | |
|---|---|---|---|---|
| slant angle | $T_1$ | $T_2$ | $T_3$ | $T_4$ |
| 0 | 90 | 90 | 90 | 90 |
| 1 | 126.71 | 103.27 | 94.37 | 71.29 |
| 2 | 160.36 | 119.73 | 100.27 | 59.64 |
| 3 | −165.67 | 145.71 | 107.29 | 58.67 |
| 4 | −123.00 | −159.72 | 109.72 | 73 |

The second-level signal allocating network 304 includes a third power divider 341, a fourth power divider 342, a fifth power divider 343 and a sixth power divider 344. An input end of the third power divider 341 is coupled to a first output end c1 of the first signal synthesizer 331. An input end of the fourth power divider 342 is coupled to a second output end c2 of the first signal synthesizer 331. An input end of the fifth power divider 343 is coupled to a first output end c3 of the second signal synthesizer 332, and an input end of the sixth power divider 344 is coupled to a second output end c4 of the second signal synthesizer 332.

The antenna array 305 includes a first antenna unit 351 to a twelfth antenna unit 362. The first antenna unit 351 is coupled to a first output end of the third power divider 341, A second antenna unit 352 is coupled to a second output end of the third power divider 341, and a third antenna unit 353 is coupled to a third output end of the third power divider 341. A fourth antenna unit 354 is coupled to a first output end of the fourth power divider 342, a fifth antenna unit 355 is coupled to a second output end of the fourth power divider 342, and a sixth antenna unit 356 is coupled to a third output end of the fourth power divider 342. A seventh antenna unit 357 is coupled to a first output end of the fifth power divider 343, an eighth antenna unit 358 is coupled to a second output end of the fifth power divider 343, and a ninth antenna unit 359 is coupled to a third output end of the fifth power divider 343. A tenth antenna unit 360 is coupled to a first output end of the sixth power divider 344, an eleventh antenna unit 361 is coupled to a second output end of the sixth power divider 344, and the twelfth antenna unit 362 is coupled to a third output end of the sixth power divider 344. A sum of phases of each group of antenna units in the antenna array 305 is the same.

In FIG. 3, signals output by the second-level signal allocating network 304 to the antenna array 305 are signals T11 to T43. Phases of signals received by the antenna units in the antenna array 305 are respectively $P(T_{11})$, $P(T_{12})$, $P(T_{13})$, $P(T_{21})$, $P(T_{22})$, $P(T_{23})$, $P(T_{31})$, $P(T_{32})$, $P(T_{33})$, $P(T_{41})$, $(T_{42})$, and $P(T_{43})$.

Each antenna unit in the antenna array 305 meets the requirements of Equation (2):

$$P(T_{11})+P(T_{43})= \ldots =P(T_{23})+P(T_{31}) \quad (2)$$

Figure 4:
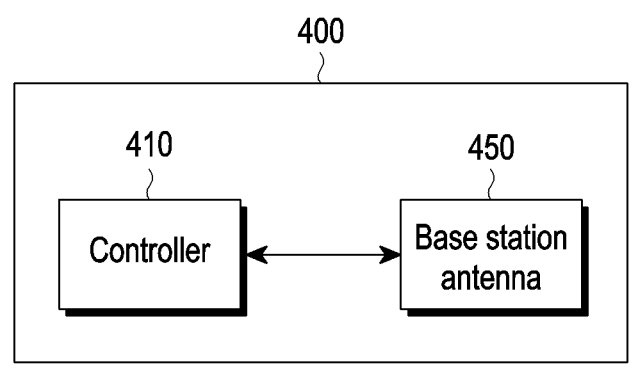
FIG. 4 illustrates a base station including a base station antenna, according to an embodiment.

FIG. 4 illustrates a base station including a base station antenna, according to some an embodiment.

Referring to FIG. 4, a base station 400 includes a controller (or processor) 410 and a base station antenna 450.

The base station antenna 450, for example, may be embodied as the base station antenna illustrated in FIG. 1 or in FIG. 3, as described above.

The controller 410 may control a series of processes so that the base station 400 can operate according to the above-described embodiments of the disclosure.

In view of foregoing, in accordance with an embodiment of the disclosure, a base station antenna performs a vector synthesizing process on signals by utilizing a signal synthesizer in order to avoid using a phase shifter and a sum-difference device. This improved base station antenna simplifies a structure of a signal coupling network by reducing a quantity of components included in the signal coupling network and simplifying connections among the fewer components. As a result, insertion loss of the base station antenna is reduced and the flexibility for establishing the signal coupling network is improved. More specifically, because the signal synthesizer is used to simply the structure of the signal coupling network, the base station antenna may quickly iterate based on practical needs.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A base station antenna, comprising:
  a transceiver array configured to output M signals, wherein M is an integer greater than one;
  an antenna array including N antenna units, wherein N is an integer greater than M;
  a first-level signal allocating network configured to allocate first power to the M signals, and output P signals, wherein P is an integer greater than M;
  a signal synthesizing network including multiple signal synthesizers, wherein each of the multiple signal synthesizers utilizes two signals of the P signals to synthesize two output signals; and
  a second-level signal allocating network configured to allocate second power to signals output by the multiple signal synthesizers, and output N signals to the N antenna units.

2. The base station antenna of claim 1, wherein each of the multiple signal synthesizers comprises a microstrip line on a dielectric substrate.

3. The base station antenna of claim 1, wherein for any two groups of antenna units in the antenna array, a sum of phases of each antenna unit in a first group of antenna units is equal to a sum of phases of each antenna unit in a second group of antenna units, and
  wherein each of the first group of antenna units and the second group of antenna units comprises two antenna units with symmetrical positions in the antenna array.

4. The base station antenna of claim 1, wherein the first-level signal allocating network comprises multiple power dividers, and
  wherein the second-level signal allocating network comprises multiple power dividers.

5. The base station antenna of claim 1, wherein the transceiver array comprises:
  a first transceiver; and
  a second transceiver,
  wherein the first-level signal allocating network comprises:
    a first power divider configured to couple to an output end of the first transceiver via an input end of the first power divider; and
    a second power divider configured to couple to an output end of the second transceiver via an input end of the second power divider, and
  wherein the signal synthesizing network comprises:
    a first signal synthesizer configured to couple to a first output end of the first power divider via a first input end of the first signal synthesizer, and couple to a first output end of the second power divider via a second input end of the first signal synthesizer; and
    a second signal synthesizer configured to couple to a second output end of the first power divider via a first input end of the second signal synthesizer, and couple to a second output end of the second power divider via a second input end of the second signal synthesizer.

6. The base station antenna of claim 5, wherein the second-level signal allocating network comprises:
  a third power divider configured to couple to a first output end of the first signal synthesizer via an input end of the third power divider;
  a fourth power divider configured to couple to a second output end of the first signal synthesizer via an input end of the fourth power divider;
  a fifth power divider configured to couple to a first output end of the second signal synthesizer via an input end of the fifth power divider; and
  a sixth power divider configured to couple to a second output end of the second signal synthesizer via an input end of the sixth power divider, and
  wherein the antenna array comprises:
    a first antenna unit configured to couple to a first output end of the third power divider;

a second antenna unit configured to couple to a second output end of the third power divider;
a third antenna unit configured to couple to a third output end of the third power divider;
a fourth antenna unit configured to couple to a first output end of the fourth power divider;
a fifth antenna unit configured to couple to a second output end of the fourth power divider;
a sixth antenna unit configured to couple to a third output end of the fourth power divider;
a seventh antenna unit configured to couple to a first output end of the fifth power divider;
an eighth antenna unit configured to couple to a second output end of the fifth power divider;
a ninth antenna unit configured to couple to a third output end of the fifth power divider;
a tenth antenna unit configured to couple to a first output end of the sixth power divider;
an eleventh antenna unit configured to couple to a second output end of the sixth power divider; and
a twelfth antenna unit configured to couple to a third output end of the sixth power divider.

7. The base station antenna of claim 5, wherein a sum of phases of the first output end of the first signal synthesizer and the second output end of the second signal synthesizer is equal to a sum of phases of the second output end of the first signal synthesizer and the first output end of the second signal synthesizer.

8. The base station antenna of claim 1, wherein each of the multiple signal synthesizers performs a vector synthesis on two of the P signals, and obtains the two output signals.

9. The base station antenna of claim 1, wherein the transceiver array is further configured to adjust a slant angle of the antenna array by adjusting a phase difference between different transceivers.

10. A base station, comprising:
a base station antenna; and
at least one processor,
wherein the base station antenna includes:
a transceiver array configured to output M signals, wherein M is an integer greater than 1,
an antenna array including N antenna units, wherein N is an integer greater than M,
a first-level signal allocating network configured to allocate first power to the M signals, and output P signals, wherein P is an integer greater than M,
a signal synthesizing network including multiple signal synthesizers, wherein each of the multiple signal synthesizers utilizes two signals of the P signals to synthesize two output signals, and
a second-level signal allocating network configured to allocate second power to signals output by the multiple signal synthesizers, and output N signals to the N antenna units.

11. The base station of claim 10, wherein the each of the multiple signal synthesizers comprises a microstrip line on a dielectric substrate.

12. The base station of claim 10, wherein for any two groups of antenna units in the antenna array, a sum of phases of each antenna unit in a first group of antenna units is equal to a sum of phases of each antenna unit in a second group of antenna units, and
wherein each of the first group of antenna units and the second group of antenna units comprises two antenna units with symmetrical positions in the antenna array.

13. The base station of claim 10, wherein the first-level signal allocating network comprises multiple power dividers, and
wherein the second-level signal allocating network comprises multiple power dividers.

14. The base station of claim 10, wherein the transceiver array comprises:
a first transceiver; and
a second transceiver,
wherein the first-level signal allocating network comprises:
a first power divider configured to couple to an output end of the first transceiver via an input end of the first power divider; and
a second power divider configured to couple to an output end of the second transceiver via an input end of the second power divider, and
wherein the signal synthesizing network comprises:
a first signal synthesizer configured to couple to a first output end of the first power divider via a first input end of the first signal synthesizer, and couple to a first output end of the second power divider via a second input end of the first signal synthesizer; and
a second signal synthesizer configured to couple to a second output end of the first power divider via a first input end of the second signal synthesizer, and couple to a second output end of the second power divider via a second input end of the second signal synthesizer.

15. The base station of claim 14, wherein the second-level signal allocating network comprises:
a third power divider configured to couple to a first output end of the first signal synthesizer via an input end of the third power divider;
a fourth power divider configured to couple to a second output end of the first signal synthesizer via an input end of the fourth power divider;
a fifth power divider configured to couple to a first output end of the second signal synthesizer via an input end of the fifth power divider; and
a sixth power divider configured to couple to a second output end of the second signal synthesizer via an input end of the sixth power divider, and
wherein the antenna array comprises:
a first antenna unit configured to couple to a first output end of the third power divider;
a second antenna unit configured to couple to a second output end of the third power divider;
a third antenna unit configured to couple to a third output end of the third power divider;
a fourth antenna unit configured to couple to a first output end of the fourth power divider;
a fifth antenna unit configured to couple to a second output end of the fourth power divider;
a sixth antenna unit configured to couple to a third output end of the fourth power divider;
a seventh antenna unit configured to couple to a first output end of the fifth power divider;
an eighth antenna unit configured to couple to a second output end of the fifth power divider;
a ninth antenna unit configured to couple to a third output end of the fifth power divider;
a tenth antenna unit configured to couple to a first output end of the sixth power divider;
an eleventh antenna unit configured to couple to a second output end of the sixth power divider; and
a twelfth antenna unit configured to couple to a third output end of the sixth power divider.

16. The base station of claim 14, wherein a sum of phases of the first output end of the first signal synthesizer and the second output end of the second signal synthesizer is equal to a sum of phases of the second output end of the first signal synthesizer and the first output end of the second signal synthesizer.

17. The base station of claim 10, wherein each of the multiple signal synthesizers performs a vector synthesis on two of the P signals, and obtains the two output signals.

18. The base station of claim 10, wherein the transceiver array is further configured to adjust a slant angle of the antenna array by adjusting a phase difference between different transceivers.

* * * * *